United States Patent [19]

Morin et al.

[11] Patent Number: 5,014,503
[45] Date of Patent: May 14, 1991

[54] CORN STERILIZING MACHINE

[75] Inventors: Marcel Morin; Jacques Morin, both of Lailly En Val, France

[73] Assignee: Morin Freres, Lailly En Val, France

[21] Appl. No.: 100,616

[22] Filed: Sep. 24, 1987

[30] Foreign Application Priority Data

Oct. 3, 1986 [FR] France .................. 86 13801

[51] Int. Cl.⁵ .............................. A01D 27/00
[52] U.S. Cl. ................................ 56/63; 56/500
[58] Field of Search .............. 56/500, 503, 119, 192, 56/295, 63, 51, 56, 53; 171/5

[56] References Cited

U.S. PATENT DOCUMENTS

| | | | |
|---|---|---|---|
| 2,365,997 | 12/1944 | Belfer | 56/119 |
| 2,631,419 | 3/1953 | Craft | 56/500 |
| 2,657,513 | 11/1953 | Martin | 56/500 |
| 2,720,071 | 10/1955 | Watanabe | 56/295 |
| 2,862,345 | 12/1958 | Wigham | 56/119 |
| 2,891,369 | 6/1959 | Rietz | 56/295 |
| 2,911,780 | 11/1959 | Brady | 56/192 |
| 2,936,564 | 5/1960 | Berry | 56/295 |
| 3,025,653 | 3/1962 | Ackerman | 56/63 |
| 3,059,403 | 10/1962 | Bamford et al. | 56/192 |
| 3,422,610 | 1/1969 | Wetherell | 56/63 |
| 3,433,004 | 3/1969 | Blunk et al. | 56/119 |
| 3,662,526 | 5/1972 | Smith | 56/63 |
| 3,695,013 | 10/1972 | Hammond | 56/63 |
| 3,717,982 | 2/1973 | Meiners | 56/63 |
| 3,736,731 | 6/1973 | Hansen | 56/63 |
| 3,803,821 | 4/1974 | Peacock et al. | 56/192 |
| 3,914,923 | 10/1975 | Arends | 56/63 |
| 4,214,422 | 7/1980 | McMillen | 56/119 |
| 4,258,537 | 3/1981 | Christman | 56/63 |

FOREIGN PATENT DOCUMENTS

A7112491 3/1973 Netherlands .

Primary Examiner—Paul J. Hirsch
Attorney, Agent, or Firm—Sandler, Greenblum & Bernstein

[57] ABSTRACT

Corn sterilizing machine of the type using rotary blades. The machine uses a castrating head in the form of a case enclosing a rotary blade. The front surface of the case has a slot allowing for the introduction of the panicle to be cut. Each one of the vertical edges of the slot has a pivotable shutter having two upper and lower ramps, respectively.

20 Claims, 2 Drawing Sheets

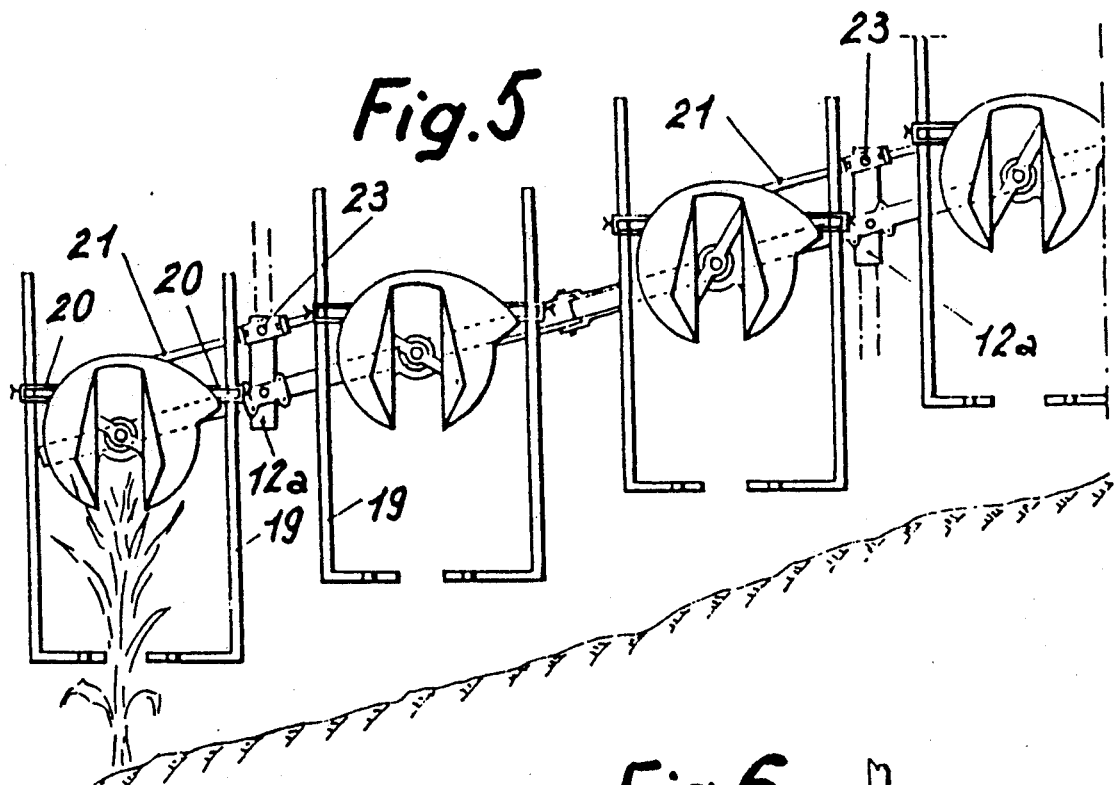
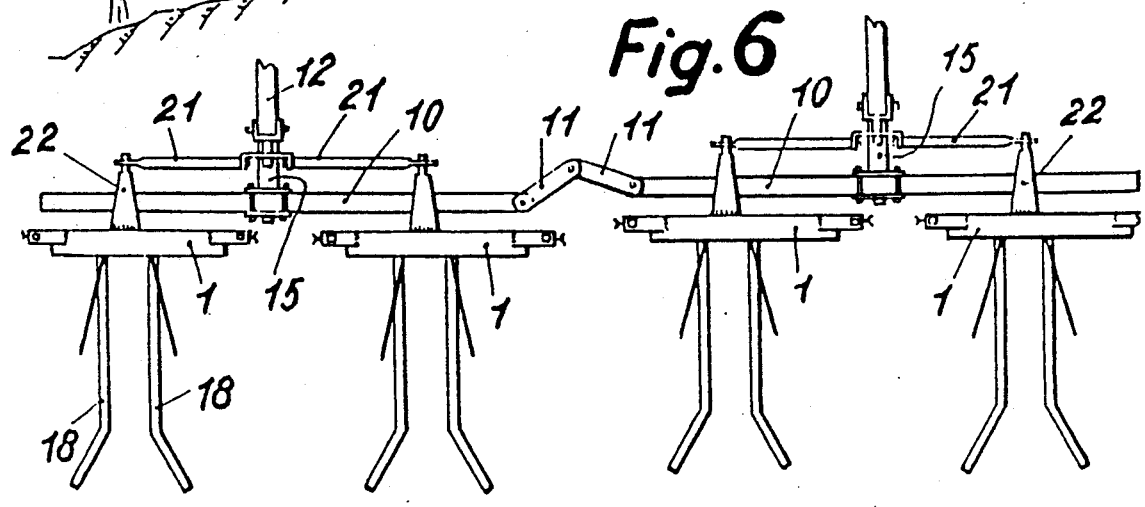
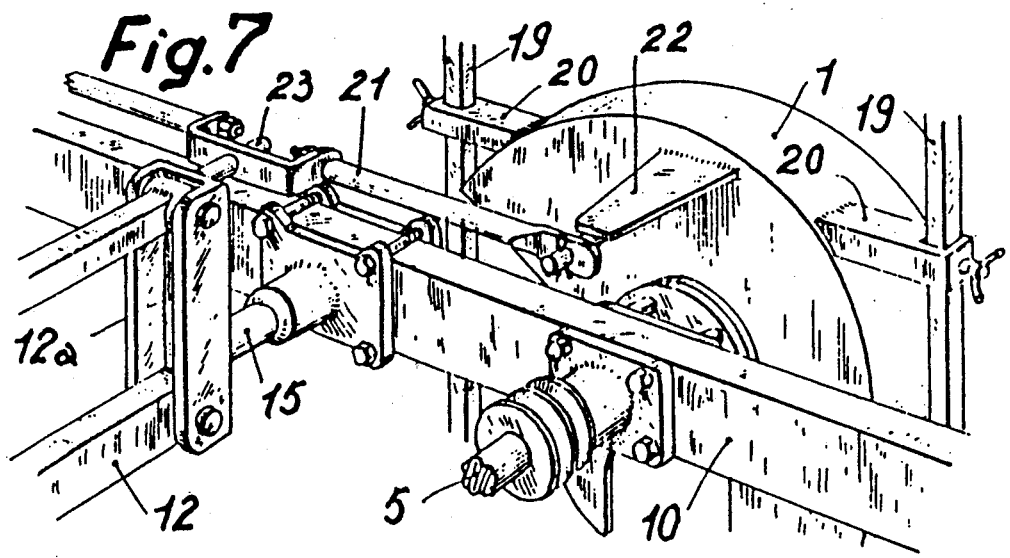

CORN STERILIZING MACHINE

BACKGROUND OF THE INVENTION

1. Field of the Invention

The present invention relates to a corn sterilizing machine.

2. Description of Background and Relevant Information

When a farmer produces seed corn, it is usually obtained by hybridization of two varieties.

The rows of one variety are alternated with those of another variety which are to fertilize the first variety.

Therefore, it is essential to remove the male elements from the variety which is to be fertilized by the second variety. The male elements are situated in the upper part of the seedling and should be removed when they appear.

Until now, this "castration" has been performed manually. Recently, there has been use of machines comprising rotary knives with vertical axes which cut off the upper part of the plant carrying the male elements and which, therefore, work like a lawnmower.

Since the panicle that has the elements to be removed is usually interwoven with the upper leaves of the seedling, the current machines, because of the way they work, cut off an important part of the greenery, which greatly harms later development of the corn seedling.

SUMMARY OF THE INVENTION

The present invention, which presents a solution to this drawback, is noteworthy in that for each row of corn to be treated, it comprises a castrating head comprising a case open toward the front, enclosing a rotary blade whose axis is approximately perpendicular to the stem of the plant and extends toward the forward direction of the machine. The ends of the blade are bent in a right angle to form two knives which cut off the upper part of the plant in a transversal direction in the forward direction of the machine.

BRIEF DESCRIPTION OF THE DRAWINGS

Other characteristics will become clearer from the following description with reference to the attached drawings, as an example only:

FIG. 5 is a view along F of FIG. 4 showing the possible use of the machine on sloping terrain;

FIG. 6 is a top view of FIG. 5;

FIG. 7 is a partial view on a larger scale and in perspective showing details of the embodiment;

DESCRIPTION OF PREFERRED EMBODIMENTS

Figure 1:
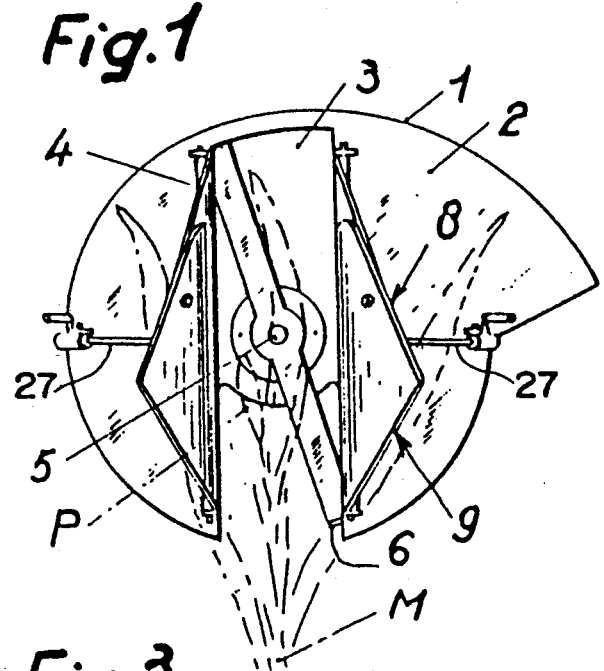
FIG. 1 is an elevational view of a castrating head according to the invention.

In referring to the drawings, it can be seen that in its simplest form, each castrating head comprises a case 1, presenting on its front side 2 an opening 3, and enclosing a severing device in the form of a blade 4 mounted on a shaft 5 whose axis extends to the plane of the row to be treated approximately perpendicular to the stems of the corn seedlings M.

Blade 4 is bent in a right angle at its ends to form two knives 6. Its axis extends onto the plane of the row to be treated approximately perpendicular to the stems of corn.

Figure 2:
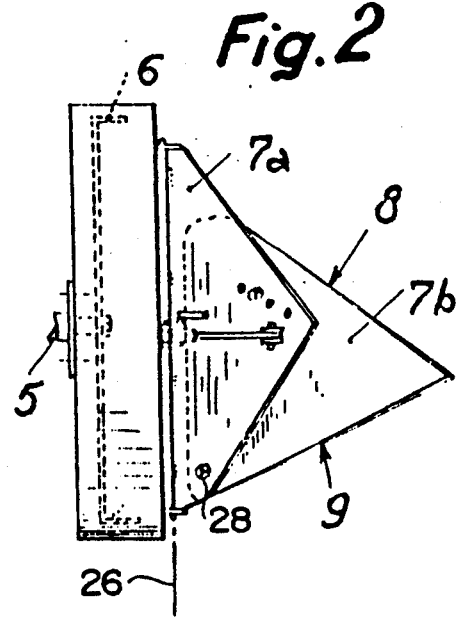
FIG. 2 is a left-hand view of FIG. 1.
Figure 3:
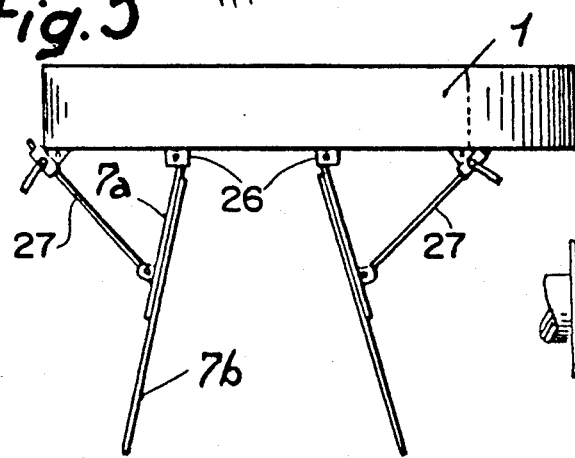
FIG. 3 is a top view of FIG. 1.

The vertical edges of opening 3 each present a shutter in two parts 7a and 7b, each of which is substantially planar. Part 7b is fastened onto 7a which can pivot on an approximately vertical axis 26 and can be immobilized at the required angle by mechanism 27 as shown in FIGS. 1 and 2.

Shutter 7b which is approximately shaped like a triangle is arranged so that one of its sides is approximately vertical and is journalled about a substantially vertical axis at element 28 toward the lower end of this side on shutter 7a.

In this manner, the two other sides 8 and 9 form two adjustable upper and lower ramps respectively.

The function of ramps 8 is to straighten panicle P to be cut as well as the leaf in which it is located in order to facilitate their introduction into case 1.

On the other hand, the function of ramps 9 is to bend down the underlying leaves so that they will not enter the case.

It is thus possible to cut off the panicles comprising the male elements without altering in an undesirable manner the greenery of the corn seedling.

According to an embodiment particularly applicable to machines carried by a tractor equipped with a slope correction system, the heads are affixed on bars 10 joined by journalled links 11 between them.

Each one of bars 10 is supported by the end of a pair of arms 12 journalled by its other end on an upright 13 affixed to the tractor vehicle (not shown) and which is able to pivot on an approximately vertical plane because of the action of jack 14.

Each one of bars 10 can pivot by the interposition of a shaft 15 on a plane perpendicular to that formed by arm 12 and corresponding upright 13.

Figure 4:
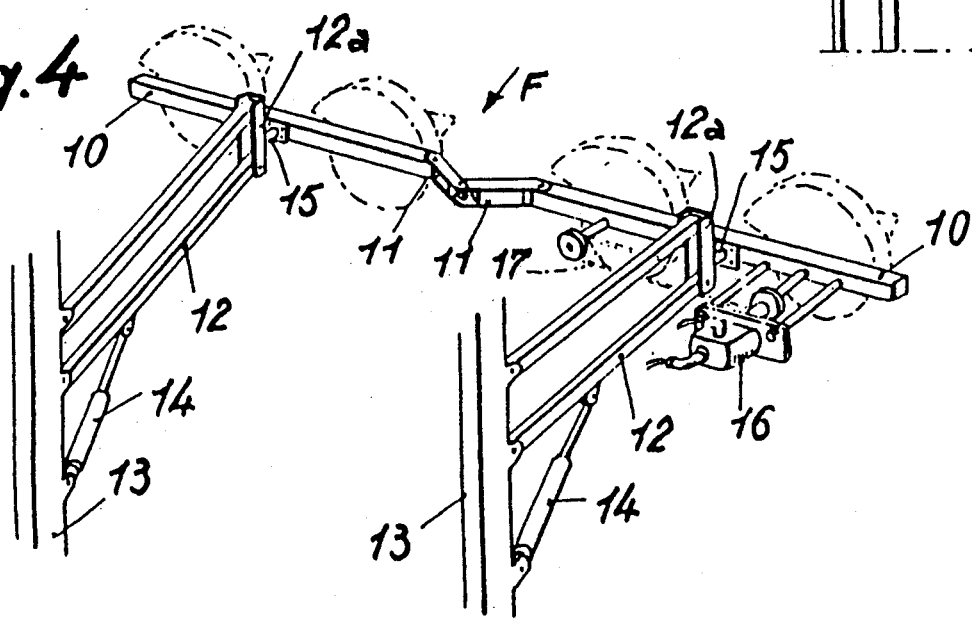
FIG. 4 is a partial view in perspective showing one embodiment of a machine according to the invention.

Therefore, as shown in FIG. 5, if the rows of corn to be treated are located on a slope, it is possible, by careful adjustment of the angle of arms 12, to keep all castrating heads approximately equidistant from the ground. As shown in FIGS. 4 and 7, a movable parallelogram linkage connecting assembly is formed by a pair of arms 12, a respective upright 13, and a relatively short arm 12a which is movable, while remaining substantially perpendicular to the ground.

The rotary driving of blades 4 is achieved by the interposition of a hydraulic motor 16 mounted at the end of one of shafts 5. The movement is transmitted to the other blades by belts, such as 17 (FIG. 4).

Each one of cases 1 is linked to guides 18 each supported by a shank 19 that can slide and be immobilized in a catch of holder 20 affixed to the case.

The function of these guides is to straighten the seedling, which would have pushed obliquely in its row on a transversal plane. This makes it possible to guarantee that it will be possible to introduce its panicle into slot 3 of the corresponding head.

Although the supporting rods 10 can be bent horizontally, it is essential that slots 3 of the heads remain vertical.

For this purpose, a further linkage assembly is provided. Each one of cases 1 can freely pivot around the axis of shaft 5 by the driving of the blade by the interposition of link 21, journalled at one of its ends onto the end of a clamp 22 of case 1, and at the other onto axis 23 parallel to shaft 5 and affixed to mobile side 12a of the deformable parallelogram comprising corresponding arms 12.

Figure 8:
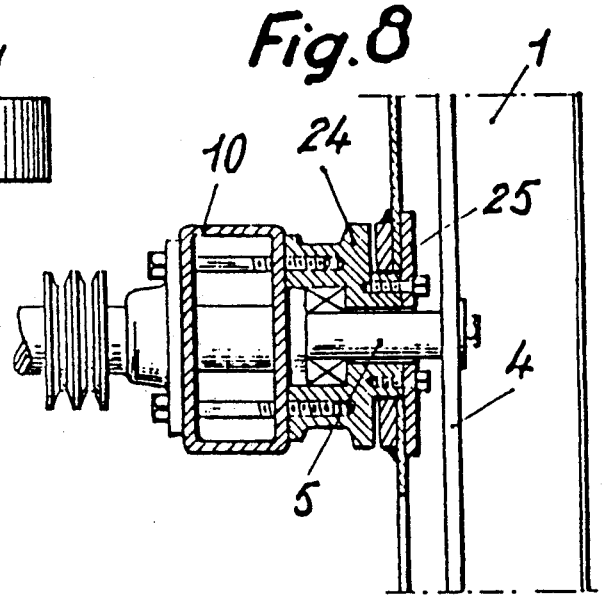
FIG. 8 is a partial view in cross section on a vertical plane passing through the axis of the rotary blade and showing the setting of the case.

FIG. 8 is an example of a way to link case 1 to bar 10. Thus, shaft 5 extends through bearing 24 externally comprising a shoulder on which the rear side of case 1 is engaged, which is held by plate 25.

The present invention is, of course, not limited to the embodiment described and shown, but rather extends to all varying shapes and sizes.

What is claimed:

1. An apparatus for removing an upper portion of a plant comprising at least one castrating head, each said castrating head comprising:
   (a) at least one case having at least one surface;
   (b) a severing device located within each said case for severing said upper portion of said plant;
   (c) a slot located in said surface, being defined by at least two substantially vertical edges;
   (d) a shutter mounted proximate each of said edges, each said shutter comprising (1) a first ramp extending upwardly toward one of said edges and (2) a second ramp extending downwardly toward said one of said edges; and
   (e) a plant straightening device supported by said case.

2. An apparatus for removing an upper portion of a plant comprising at least one castrating head, each said castrating head comprising:
   (a) at least one case having at least one surface;
   (b) a severing device located within each said case for severing said upper portion of said plant;
   (c) a slot located in said surface, being defined by at least two substantially vertical edges; and
   (d) a shutter mounted proximate each of said edges, each said shutter comprising (1) a first ramp extending upwardly toward one of said edges and (2) a second ramp extending downwardly toward said one of said edges, wherein each said shutter is adjustably pivotally mounted to said case proximate a respective one of said side edges.

3. The apparatus of claim 1, wherein said severing device comprises at least one rotary blade, said apparatus further comprising a motor for rotating said rotary blade.

4. The apparatus of claim 2, wherein said severing device comprises at least one rotary blade, and wherein said rotary blade rotates about an axis substantially perpendicular to said slot and is adapted to be substantially perpendicular to the stem of said plant to be severed.

5. An apparatus for removing an upper portion of a plant comprising at least one castrating head, each said castrating head comprising:
   (a) at least one case having at least one surface;
   (b) a severing device located within each said case for severing said upper portion of said plant;
   (c) a slot located in said surface, being defined by at least two substantially vertical edges; and
   (d) a shutter mounted proximate each of said edges, each said shutter comprising (1) a first ramp extending upwardly toward one of said edges and (2) a second ramp extending downwardly toward said one of said edges, wherein each said shutter comprises a first part adjustably mounted for pivoting about a substantially vertical axis at a respective one of said edges of said case and a second part adjustably mounted on said first part.

6. The apparatus of claim 5, wherein said second part of each shutter comprises said first ramp and said second ramp.

7. The apparatus of claim 5, wherein said second part of each said shutter is substantially planar and comprises a substantially triangular surface, and wherein said second part of each said shutter is adjustably mounted to pivot about an axis substantially perpendicular to said substantially triangular surface.

8. The apparatus of claim 7, wherein said axis is located proximate one of the apices of said substantially triangular surface.

9. An apparatus for removing an upper portion of a plant comprising at least one castrating head, each said castrating head comprising:
   (a) at least one case having at least one surface;
   (b) a severing device, comprising at least one rotary blade, located within each said case for severing said upper portion of said plant, each said blade comprising at least one end substantially perpendicular to the remainder of said blade for cutting said plant and adapted to be substantially perpendicular to the stem of said plant when cut;
   (c) a slot located in said surface, being defined by at least two substantially vertical edges; and
   (d) a shutter mounted proximate each of said edges, each said shutter comprising (1) a first ramp extending upwardly toward one of said edges and (2) a second ramp extending downwardly toward said one of said edges.

10. An apparatus for removing an upper portion of a plant comprising a plurality of castrating heads, each said castrating head comprising:
    (a) at least one case having at least one surface;
    (b) a severing device located within each said case for severing said upper portion of said plant;
    (c) a slot located in said surface, being defined by at least two substantially vertical edges;
    (d) a shutter mounted proximate each of said edges, each said shutter comprising (1) a first ramp extending upwardly toward one of said edges and (2) a second ramp extending downwardly toward said one of said edges; and
    (e) at least two uprights for attachment to a vehicle, at least one bar having attached thereto said plurality of castrating heads, and a connecting assembly connecting said at least one bar and said plurality of castrating heads to said uprights.

11. The apparatus of claim 10, wherein said connecting assembly comprises a pair of substantially parallel arms extending from first end portions connecting each of said uprights to second end portions, which are each pivotally connected to a further arm, whereby each respective upright, pair of arms, and further arm form a movable parallelogram linkage.

12. The apparatus of claim 11, further comprising a jack connected between one of said parallels arms and a respective upright for moving a respective parallelogram linkage in a substantially vertical plane.

13. An apparatus for removing an upper portion of a plant comprising a plurality of castrating heads, each said castrating head comprising:
    (a) at least one case having at least one surface;
    (b) a severing device located within each said case for severing said upper portion of said plant;

(c) a slot located in said surface, being defined by at least two substantially vertical edges;

(d) a shutter mounted proximate each of said edges, each said shutter comprising (1) a first ramp extending upwardly toward one of said edges and (2) a second ramp extending downwardly toward said one of said edges; and (e) an attaching device for attaching said apparatus to a vehicle, at least one bar having attached thereto said plurality of castrating heads, and a linkage assembly operably associated between said attaching device and said plurality of castrating heads to permit said at least one bar to be movable to and from a position inclined relative to horizontal, while maintaining each of said slots of each of said cases substantially vertical.

14. The apparatus of claim 13, wherein said linkage assembly comprises a plurality of shafts for pivotally connecting said attaching device and said bar and a respective bearing for pivotally mounting each of said cases to said bar, each of said shafts and said bearings permitting rotation around respective substantially parallels axes which are substantially perpendicular to said bar.

15. An apparatus for removing an upper portion of a plant comprising:

(a) means for severing said upper portion of said plant;

(b) means for guiding said upper portion of said plant toward said means for severing said upper portion of said plant to facilitate its removal from said plant;

(c) means for guiding leaves of said plant away from said means for severing said upper portion of said plant such that a substantial number of said leaves, or substantial portions of said leaves, are not removed from said plant; and (d) means for straightening said plant so that said plant is straightened prior to its upper portion and leaves being guided by respective means for guiding.

16. An apparatus for removing an upper portion of a plant comprising:

(a) means for severing said upper portion of said plant;

(b) a case within which said means for severing is enclosed, said case having a substantially vertically extending slot for receiving said upper portion of said plant;

(c) means for guiding said upper portion of said plant toward said means for severing said upper portion of said plant to facilitate its removal from said plant;

(d) means for guiding leaves of said plant away from said means for severing said upper portion of said plant such that a substantial number of said leaves, or substantial portions of said leaves, are not removed from said plant, wherein said means for guiding said upper portion of said plant and said means for guiding said leaves are mounted on said case proximate said slot and extend outwardly from said case; and (e) means for adjustably mounting each of said means for guiding said upper portion of said plant and said means for guiding said leaves which comprise means for vertical adjustment and means for horizontal adjustment.

17. The apparatus of claim 16, further comprising at least one motor for driving said means for severing.

18. An apparatus for removing an upper portion of a plant comprising:

(a) means for severing said upper portion of said plant comprising a plurality of severing elements;

(b) a case within which each of said means for severing is enclosed, each said case having a substantially vertically extending slot for receiving said upper portion of said plant;

(c) means for guiding said upper portion of said plant toward said means for severing said upper portion of said plant to facilitate its removal from said plant; and (d) means for guiding leaves of said plant away from said means for severing said upper portion of said plant such that a substantial number of said leaves, or substantial portions of said leaves, are not removed from said plant, and wherein said means for guiding said upper portion of said plant and said means for guiding said leaves are mounted proximate said slots of respective cases, extending outwardly therefrom.

19. The apparatus of claim 18, further comprising means for attaching said apparatus to a tractor, and means for connecting said cases for substantially vertical movement and for maintaining respective slots substantially vertical during said substantially vertical movement.

20. The apparatus of claim 18, further comprising means for attaching said apparatus to a tractor, means for connecting said cases in alignment and for permitting said cases to be vertically offset while maintaining respective slots substantially vertical.

* * * * *

UNITED STATES PATENT AND TRADEMARK OFFICE
CERTIFICATE OF CORRECTION

PATENT NO. : 5,014,503

DATED : May 14, 1991

INVENTOR(S) : Marcel MORIN et al.

It is certified that error appears in the above-identified patent and that said Letters Patent is hereby corrected as shown below:

Column 3, line 44 (claim 3, line 1), change "1" to ---2---.

Signed and Sealed this

Third Day of August, 1993

Attest:

MICHAEL K. KIRK

*Attesting Officer*     Acting Commissioner of Patents and Trademarks